(12) United States Patent
Zurmuehle et al.

(10) Patent No.: US 6,913,665 B2
(45) Date of Patent: Jul. 5, 2005

(54) METHOD AND APPARATUS FOR THE OVERLAPPING WELDING OF SHEET-LIKE PLASTIC MATERIALS

(76) Inventors: Walter Zurmuehle, Mittelgasse 10, CH-6056 Kaegiswil (CH); Paul Zimmerli, Doerflistrasse 18, CH-6056 Kaegiswil (CH)

(*) Notice: Subject to any disclaimer, the term of this patent is extended or adjusted under 35 U.S.C. 154(b) by 28 days.

(21) Appl. No.: 10/438,444

(22) Filed: May 14, 2003

(65) Prior Publication Data

US 2004/0194872 A1 Oct. 7, 2004

(30) Foreign Application Priority Data

Apr. 4, 2003 (EP) .............................................. 03007748

(51) Int. Cl.$^7$ .............................................. B32B 31/08
(52) U.S. Cl. ...................... 156/71; 156/391; 156/499; 156/544; 156/574
(58) Field of Search .......................... 156/71, 157, 391, 156/499, 544, 555, 574, 579, 580, 583.1

(56) References Cited

U.S. PATENT DOCUMENTS

| | | | | |
|---|---|---|---|---|
| 4,146,419 A | * | 3/1979 | Neidhart | 156/391 |
| 4,923,558 A | * | 5/1990 | Ellenberger et al. | 156/499 |
| 5,051,148 A | * | 9/1991 | Resch | 156/358 |
| 5,169,052 A | * | 12/1992 | Kaminski | 228/9 |
| 5,328,545 A | * | 7/1994 | Kaminski | 156/583.1 |
| 5,490,626 A | * | 2/1996 | Kaminski | 228/44.3 |
| 5,865,942 A | | 2/1999 | Sinclair | |
| 5,873,965 A | * | 2/1999 | Greller | 156/64 |
| 6,050,317 A | * | 4/2000 | Weissfloch | 156/499 |
| 6,186,210 B1 | * | 2/2001 | Gehde | 156/499 |
| 6,213,184 B1 | * | 4/2001 | Sinclair | 156/499 |

FOREIGN PATENT DOCUMENTS

| | | |
|---|---|---|
| DE | 35 37 244 | 4/1987 |
| DE | 39 21 711 | 3/1990 |
| DE | 4230 882 | 2/1999 |
| DE | 198 13 625 | 6/1999 |

* cited by examiner

Primary Examiner—James Sells
(74) Attorney, Agent, or Firm—Bachman & LaPointe, P.C.

(57) ABSTRACT

A method for the welding of plastic materials in the form of webs, films or the like by means of a heating wedge, welding being carried out without the use of a second pressure roller below the welded material webs. For this purpose, the heating wedge is placed onto the lower material web and is moved over the latter under pressure. The pressure is generated via a holding-down device which has a holding-down roller and which presses onto the upper material web and onto the heating wedge. A floating mounting for the heating wedge compensates for slight unevennesses on the lower material web.

18 Claims, 9 Drawing Sheets

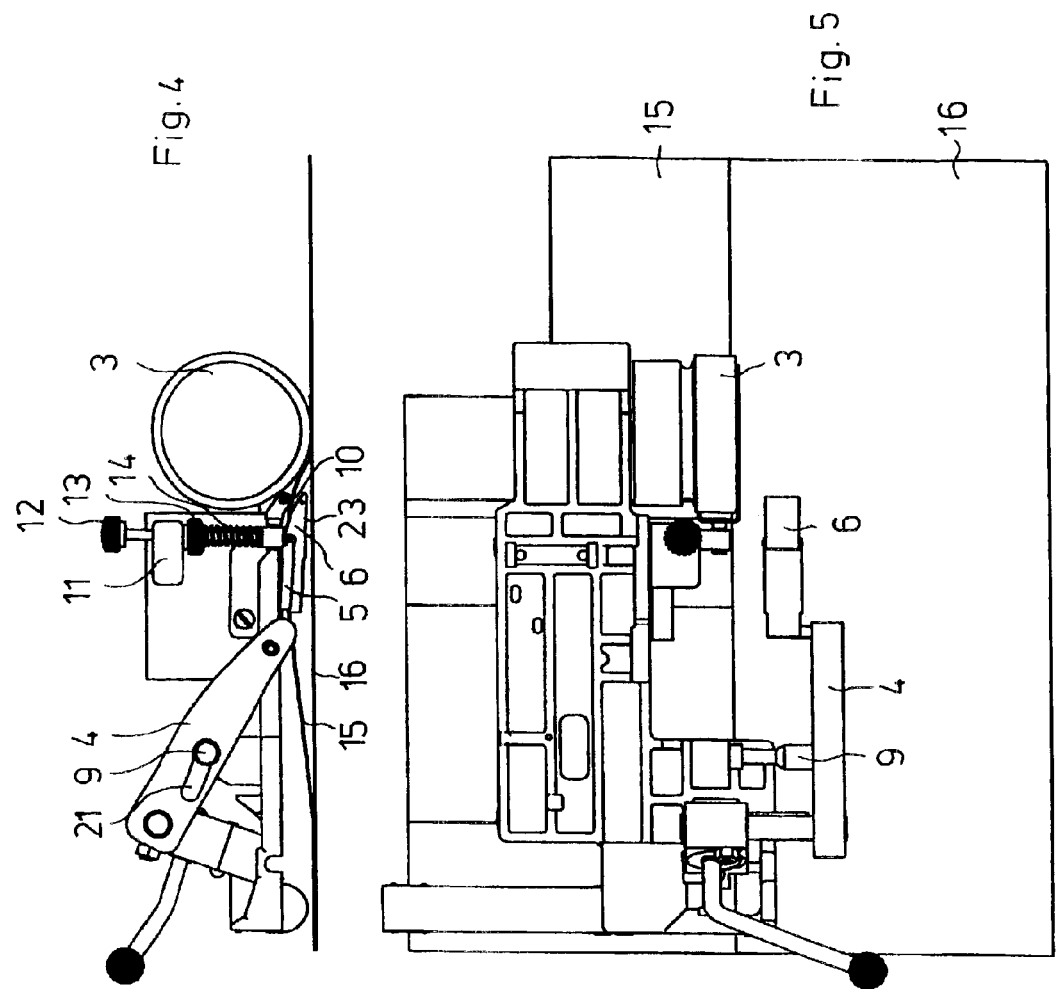

METHOD AND APPARATUS FOR THE OVERLAPPING WELDING OF SHEET-LIKE PLASTIC MATERIALS

BACKGROUND OF THE INVENTION

The present invention relates to a method for the overlapping welding of sheet-like plastic materials by means of a heating wedge which is moved between the upper and the lower web and heats the materials, the material webs, after heating and fusing, being combined and being pressed together. The invention relates, moreover, to a welding appliance for the overlapping welding of sheet-like plastic materials, with a carriage carried and driven by rollers, at least one of the rollers being designed as a pressure roller for pressing together the materials brought, hot, into contact with one another, and a heating device which can be introduced between the material webs and which, during contacting, fuses the material webs on the sides facing one another, and to the use of a guide rail for welding appliances of this type.

For the welding of sheetings consisting of coated fabric, films and sealing webs made from PVC-P, PE, ECB, CSPE, EPDM, PVDF etc. and also PE-coated list fabrics for motor trucks, tents, coverings in agriculture, biotopes, swimming pools, awnings, boat tarpaulins, inflatable boats, publicity sheetings, etc., the method initially described is employed and welding appliances of this type are used. Further similar materials occur in civil engineering, roof building or floors. The above-described plastic materials are designated below, in general, as material webs. For welding, the material webs are arranged in an overlapping manner, so that, in an overlapping region, the two material webs lie one on the other and are designated as an upper material web and a lower material web. It is also possible for the material webs to be welded together to be butted and for a strip, which covers both lower layers in an overlapping region, to be welded to the in each case lower material web.

The welding appliances may in this case have as a heating device a heating wedge, which is normally electrically heated directly, or a heating nozzle, which is to be arranged between the materials and is heated by hot air. Particularly with regard to the heating-wedge welding appliances and to the methods employed in this case, it is necessary to lift the materials to be welded, in order, after welding, to press together the material webs with sufficient force by means of pressure rollers on both sides of the materials to be welded. Examples of this machine type and of the method employed in this case may be gathered from DE 42 30 882 C2 or U.S. Pat. No. 5,865,942 A1. This method and the welding appliances used for the purpose have the disadvantages that, by the material webs being lifted, on the one hand, they may form creases which impair the weld seam, and, furthermore, there is the risk of distortion of the material webs. Furthermore, the handling of the welding appliance is made more difficult by the sometimes relatively thick and rigid material webs when these material webs are being lifted.

The object of the present invention is to provide a method and an apparatus by means of which the welding of material webs is improved and handling is facilitated.

SUMMARY OF THE INVENTION

The foregoing object is achieved, according to the invention, by means of the method and the welding apparatus of the present invention.

In the method according to the invention, the material webs to be welded are laid out, at least in the overlapping region to be welded, on a sheet-like firm base. The sheet-like firm base may in this case be a work table, the floor or another suitable inflexible base. It may, of course, also have an inclination. By the upper material web being lifted, the heating wedge is introduced between the material webs and is moved along at least one edge of the material webs which is to be welded. In this case, the heating wedge is moved along on the lower material web lying on the planar base, and the combined material webs are pressed together against the planar base by means of a pressure roller.

Thus, in the method according to the invention, it is no longer necessary to lift both material webs. By the upper material web being lifted essentially only to an extent such that the heating wedge can pass between the material webs, the lifting height is substantially lower than in the method and apparatuses employed hitherto. Consequently, a substantially better and more crease-free weld seam can be produced. Owing to the low height, there is no longer the risk of the distortion of the material webs. Surprisingly, with this method, it is possible, by the heating wedge being moved over the lower material web, to achieve sufficient fusion even here and thereafter to make a firm connection of the two material webs.

It is possible, in principle, that the sheet-like firm base either is not completely planar, but rather has different surface level heights, or, despite every care, has on it small punctiform unevennesses. In order precisely to avoid this, the methods known from the prior art have been used and corresponding welding appliances employed. According to a preferred embodiment of the method, therefore, during movement over the lower material web, the heating wedge, in the event of unevennesses, is moved under the latter in the vertical direction without loss of contact. By virtue of a floating mounting, slight unevennesses of this kind below the lower material web can be compensated by the heating wedge. In addition to this, the heating wedge is pressed onto the lower material web via a resiliently mounted holding-down roller which presses the upper material web against top sides of the heating wedge. This ensures that both material webs are sufficiently contacted by the heating wedge and consequently heated and at the same time can react automatically to variations in the base.

For carrying out the method, advantageously, the heating wedge is adjusted out of a standby position into a welding position. In the welding position, the heating wedge is moved with its tip between the material webs and near to the pressure roller and is held on the lower material web. Consequently, the parameters necessary for the process of connection between the material webs are maintained, in that, immediately after being combined, the materials are pressed together against the base by means of a pressure roller.

This advantageously takes place in such a way that the heating wedge is brought out of the standby position, in which it is usually already heated, but not yet held in the welding position, into a first intermediate position near to and above the lower material web. The upper material web is then lifted and, in a second intermediate position, the welding wedge is moved, without pressure on the lower material web, between the upper and the lower material web. Finally, the heating wedge is brought in the longitudinal direction of the heating wedge into the above-described welding position. In this, the full contacting of the upper and lower material web with the top side and the underside of the heating wedge takes place.

According to a further preferred embodiment of the method, when the welding position is reached, the welding operation is started automatically and the heating wedge is guided along the material web to be welded. Correspondingly, and conversely, a termination of the movement of the heating wedge relative to the material webs and consequently a termination of the welding operation take place when the heating wedge is moved out of the welding position. The movement of the heating wedge in the standby position to the welding position normally takes place manually by means of the operator, but a corresponding motor drive may also be provided.

In practice, to avoid the heating unit displacing the material, it is customary to tack the materials or to adhesively bond them to one another beforehand by means of a double insulating tape. According to a further preferred embodiment, the fixing of the material webs takes place only in the region around the heating wedge during the welding operation, whereas the material webs are not retained in the region in which welding is not being carried out at that moment. Preferably, this is carried out by means of an extendable rail which is laid on the upper material web and which is pressed down in the region of the heating wedge precisely during the welding operation. Pressing down in this case takes place at a particular distance from the material web edge to be welded and over a particular length in front of and behind the heating wedge. By virtue of the extendability of the rail, for example by means of a second rail, a continuous sequence can be achieved over the entire material web by the repeatedly renewed application of the rail which has just become free.

The welding appliance according to the invention comprises a device for carrying and moving the heating device in the form of a heating wedge from a standby position remote from the pressure roller to a welding position located near to the pressure roller and on the lower material web and a device for pressing the heating wedge resiliently onto the lower material web in the welding position. The device for carrying and moving the heating wedge may in this case, depending on the design of the carriage, consist of various structures making it possible to bring the heating wedge out of the standby position into the welding position. The device for pressing the heating wedge resiliently may press the heating wedge onto the lower material web directly or indirectly via the upper material web.

According to a preferred embodiment of the device for carrying and moving the heating wedge, this has means for moving the heating wedge both in the longitudinal direction of the heating wedge and transversely to this. Thus, during the movement of the heating wedge out of the standby position into the welding position, these means also bring about specific transverse movements simultaneously with the movement in the longitudinal direction.

According to a preferred embodiment of the welding appliance, the device for carrying and moving the heating wedge has a holding arm, at the front end of which the heating wedge is arranged. According to a further advantageous refinement, this holding arm is provided with a guide slot, into which a guide pin engages. The guide slot issues into a guide orifice with guide edges, so that the guide pin, when it penetrates into the guide orifice, induces a movement of the holding arm transversely to the longitudinal direction of the heating wedge. Correspondingly designed guide edges in the guide orifice bring about the desired movement of the guide wedge mounted at the end of the holding arm into various positions.

In addition, a device for starting the forward movement of the welding appliance is expediently arranged on the holding arm. This device also causes the welding appliance to stop when the heating wedge moves out of the welding position.

According to a particularly preferred refinement of the invention, the device for pressing the heating wedge resiliently onto the lower material web comprises a pressure device for pressing the upper material web onto the heating wedge. In this case, the pressure device is preferably designed as a holding-down roller which is resiliently adjustable in the vertical direction and which at the same time also presses the heating wedge against the lower material web via the upper material web. Bearing elements for the heating wedge allow a restricted movement of the heating wedge in the vertical direction, so that it can thereby react to unevennesses below the lower material web. The movements of the heating wedge in the vertical direction thus allow a lowering or raising of the heating wedge or the tip or a lateral tilting.

In order to ensure sufficient contacting with the material webs, the upper heating contact surface of the heating wedge is arcuate and the lower heating contact surface is planar. Preferably, the lower heating contact surface is designed to be longer than the upper one, in order, in the case of unevennesses which may possibly bring about a brief release of the heating contact surface from the lower material web in some regions, nevertheless to ensure sufficient fusion over the length of the heating zone.

According to a further advantageous refinement, the heating appliance has a guide device which presses onto a rail lying on the material webs. This guide device and the associated rail may, of course, be used not only in the case of a welding appliance with a heating wedge, but also in the case of a welding appliance with a hot-air device and welding nozzle. The rail, for example with a maximum length of 2 m, may in this case be designed in such a way that, by two rails of this type being lined up with one another, a continuous run of the welding appliance along the material webs is possible. By the weight of the welding appliance, the rail is pressed onto the material webs precisely in the region in which the heating wedge is located, so that distortion or creasing is not readily possible here. Preferably, therefore, the guide device is arranged on that side of the carriage which is located opposite the heating device and has suitable rollers which press onto the rail.

The object is therefore also achieved by a special use of the guide rail in the overlapping welding of sheet-like plastic materials, with a carriage carried and driven by rollers and with a heating element for fixing the material webs, in that, during the welding operation, the material webs are pressed down by the weight of the carriage against distortion, preferably in the region around the heating element, during the welding operation.

The invention thus affords a possibility by which welds of better quality than hitherto can be carried out. Furthermore, the welding operation can be implemented with little effort.

BRIEF DESCRIPTION OF THE DRAWINGS

The invention is explained in more detail below by means of an exemplary embodiment in conjunction with the accompanying drawings in which:

FIG. 4 illustrates a side view without a housing, with holding arm and heating wedge, in the first intermediate position;

FIG. 5 illustrates a top view of the holding arm and heating wedge in the first intermediate position;

FIG. 12 illustrates an enlarged side view of a heating wedge with a holding plate.

DETAILED DESCRIPTION

Figure 1:
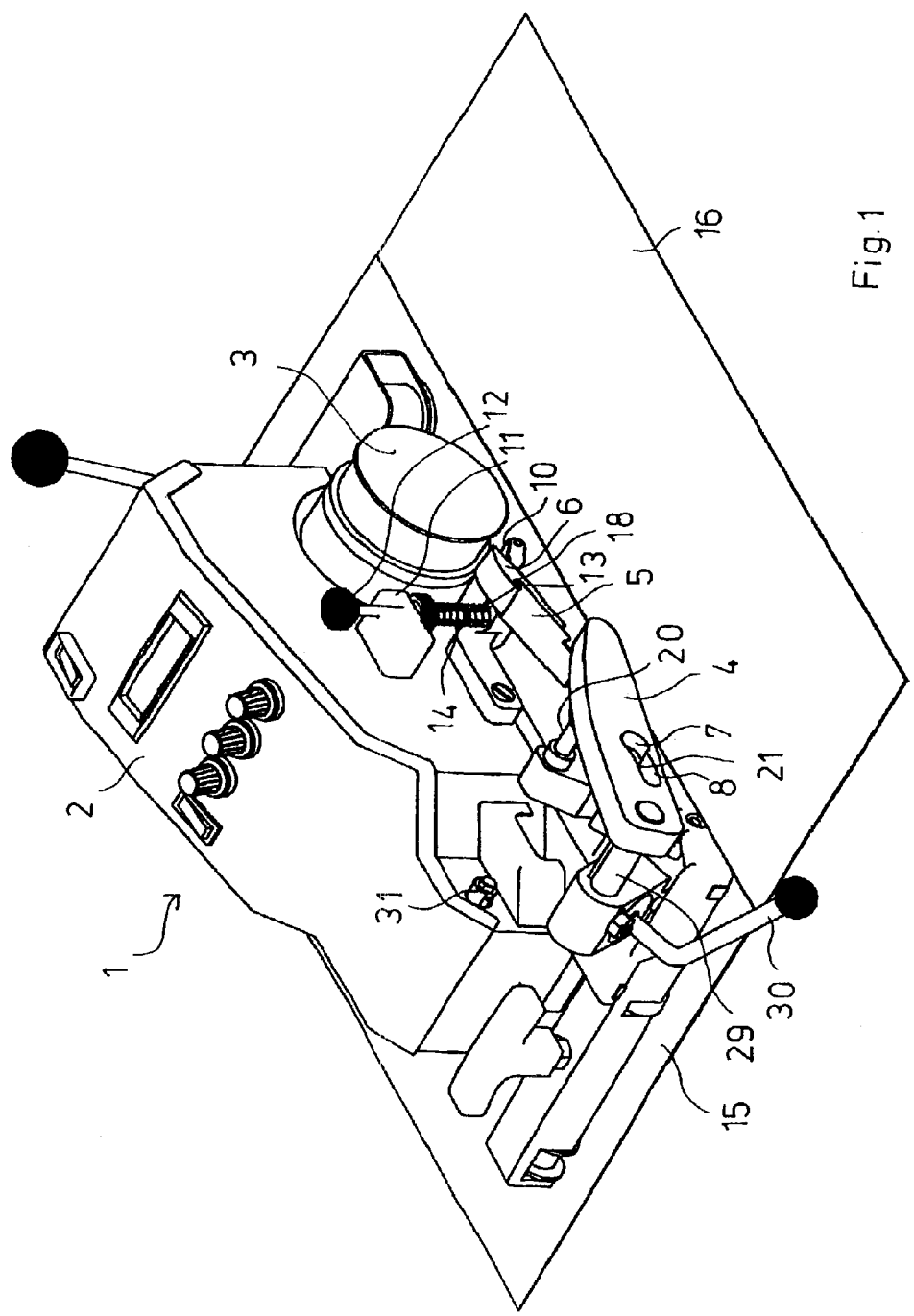
FIG. 1 illustrates a perspective view of a welding appliance with holding arm and welding wedge in the standby position.

FIG. 1 illustrates the welding appliance 1 with the housing 2 and with the pressure roller 3 which is at the same time also a drive roller. The basic construction of welding appliances of this type is generally known and is not described in any more detail below. Arranged on the housing 2 is a holding arm 4 which at one end carries the heating wedge 6 via a holding plate 5. The heating wedge 6 is electrically heated in the usual way and, for this purpose, contains the necessary feeders and devices which are known to a person skilled in the art and are therefore not discussed in any more detail. The heating wedge 6 (FIG. 12) is mounted in elongate vertical lugs 18 of the holding plate 5 via pins 17, so that controlled movements in the vertical direction as a result of unevennesses can be executed. The heating wedge 6 has a curved upper heating contact surface 22 and a lower planar heating contact surface 23. The latter is longer than the upper heating contact surface 22.

Figure 2:
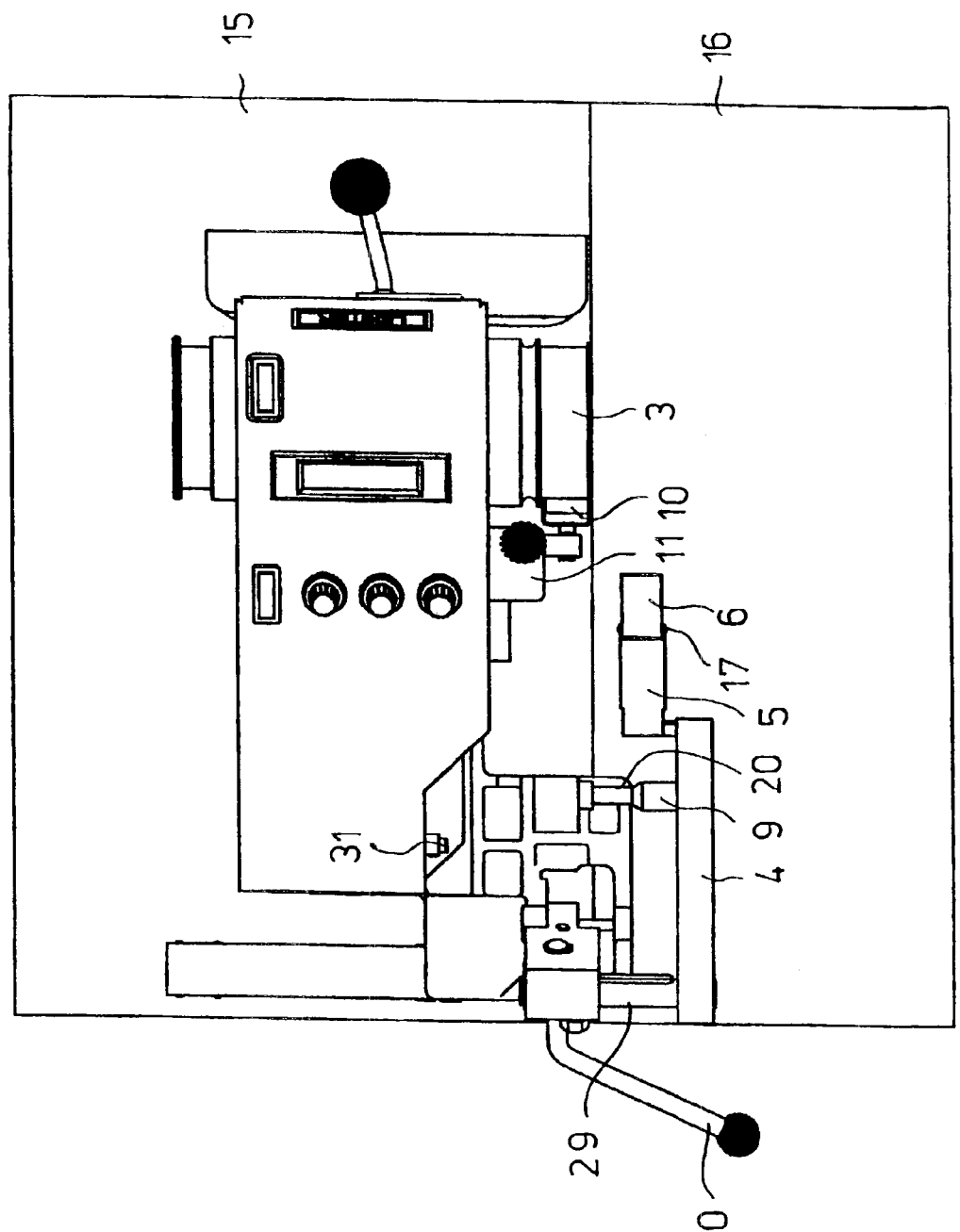
FIG. 2 illustrates a top view of the welding appliance in the standby position.
Figure 3:
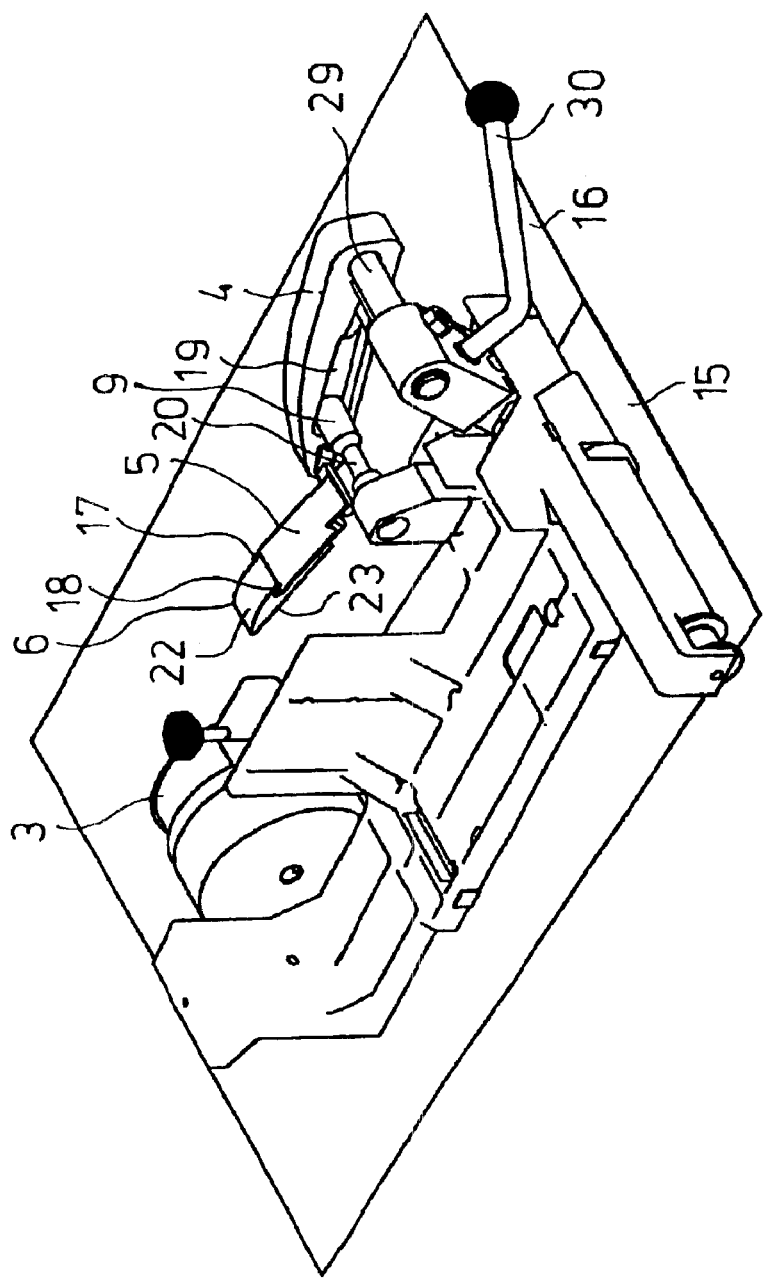
FIG. 3 illustrates a second perspective view without a housing, with holding arm and welding wedge, in the standby position.

FIG. 1 and FIGS. 2 and 3 show the holding arm 4 in the standby position, so that the heating wedge 6 is remote from the pressure roller 3. In the standby position, the heating wedge 6 is located laterally above the upper material web 15. As is evident from the Figures, in this exemplary embodiment, the heating wedge 6 is angled with respect to the holding arm. Located in the holding arm 4 is an orifice 7 with edges 8 which serve for guidance during the movement of the holding arm 4 by means of a rigid guide pin 9, illustrated in FIG. 3, which has a narrowing 20. The guide pin 9 engages into a guide slot 19 arranged in the holding arm 4 and is guided by said guide slot. Due to the narrowing 20 of the guide pin 9, the guide pin 9, when it is located in the region 21 of the orifice 7, cannot leave the position near the housing and, moreover, causes a lowering of the holding arm 4, since the latter is then guided by the narrowed region 20.

The movement of the holding arm 4 into the individual further positions described below is carried out, in this exemplary embodiment by hand, by means of the actuating lever 30 via a rack 29. In the welding position, the rack 29 is then in a position in which it presses against the switch 31 on the housing 2 and consequently initiates or, conversely, stops the advance via the pressure roller.

The reference numerals 15 and 16 designate the upper material web and the lower material web respectively. Located in the vicinity of the pressure roller 3 is a holding-down roller 10 which is pressed onto the upper material web 15 via a resiliently mounted holding-down device 11. The holding-down device 11 has an upper screw 12 for setting the position and a lower screw 13 for setting the pressure force via the spring 14.

FIGS. 4 and 5 show the holding arm 4 with the heating wedge 6 in the first intermediate position. In this intermediate position, the heating wedge 6 is located near to and above the lower material web 16, but without touching the latter, although still laterally of the upper material web 15. In this position, the guide pin 9 is at the end of the guide slot 19 in front of the orifice 7.

Figure 6:
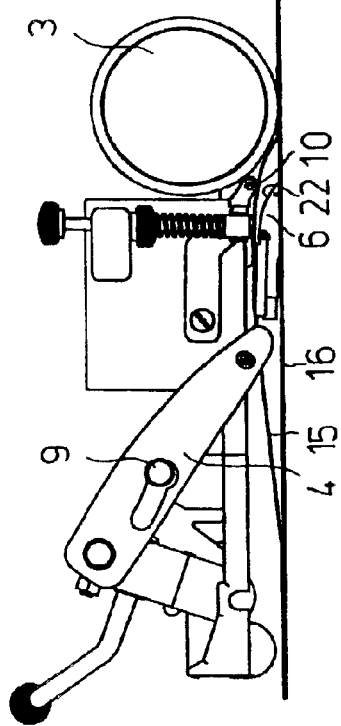
FIG. 6 illustrates a side view without a housing, with holding arm and heating wedge, in the second intermediate position.
Figure 7:
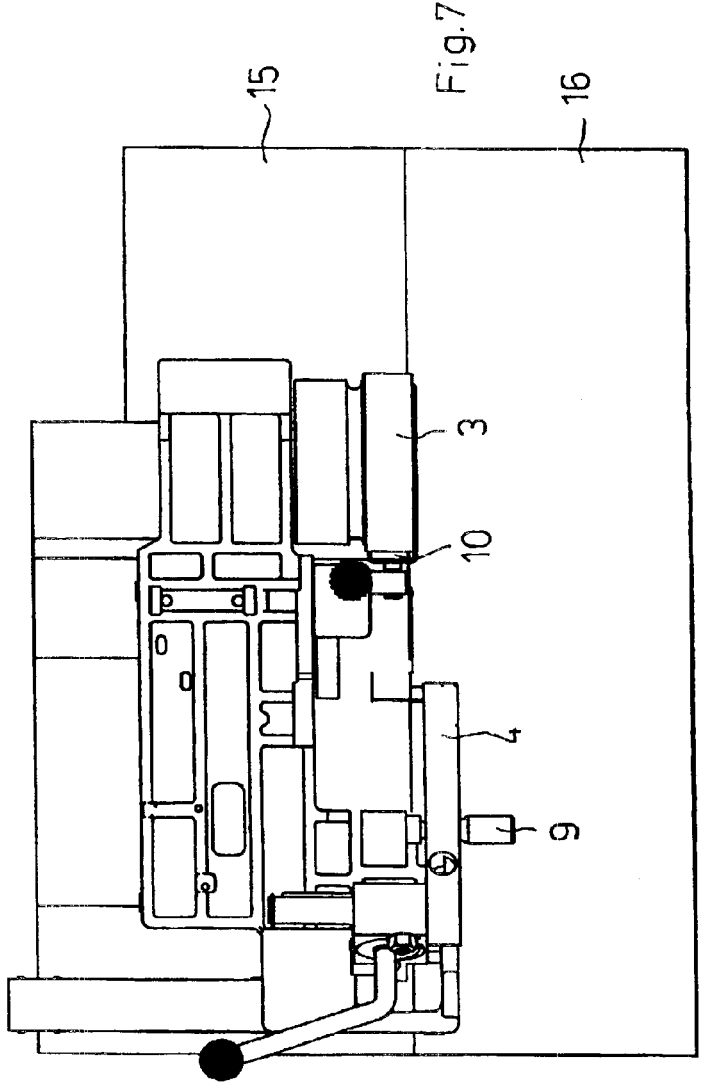
FIG. 7 illustrates a top view of the holding arm and heating wedge in the second intermediate position.

In FIGS. 6 and 7, the guide pin 9 has passed with its full length through the orifice 7, so that the holding arm 4 with the heating wedge 6 has moved in the direction of the housing 2 and has been lowered by means of the narrowing 20. FIGS. 6 and 7 show the second intermediate position, in which the heating wedge 6 is located between the upper material web 15 and the lower material web 16, without the upper material web 15 already being pressed onto the top side of the heating wedge 6. The heating wedge 6 already lies on the lower material web 16. The holding-down roller 10 is not yet placed onto the heating wedge 6, so that the upper material web 15 is still lifted off from the upper heating contact surface 22 of the heating wedge 6.

Figure 8:
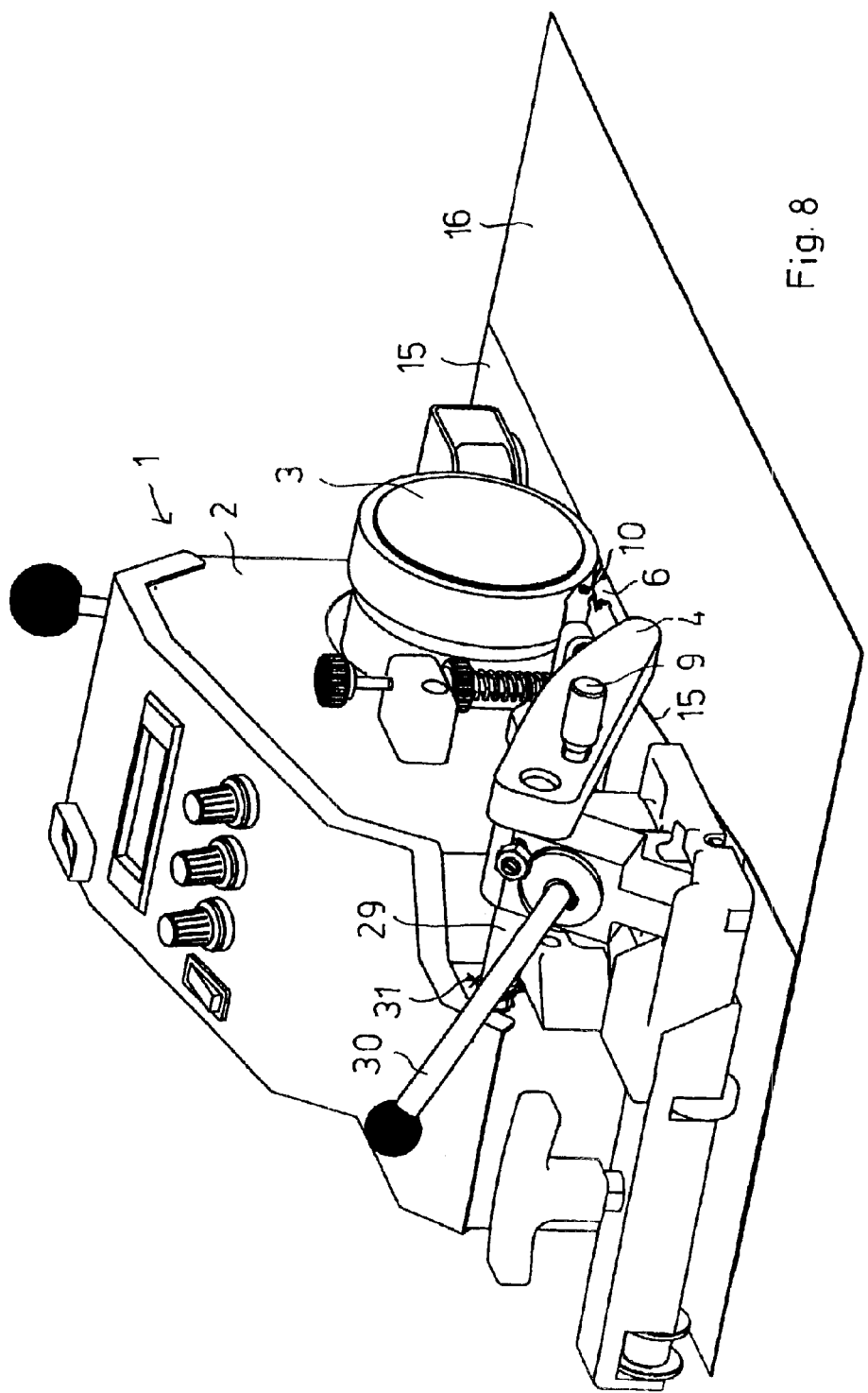
FIG. 8 illustrates the view according to FIG. 1 with the holding arm and heating wedge in the welding position.
Figure 9:
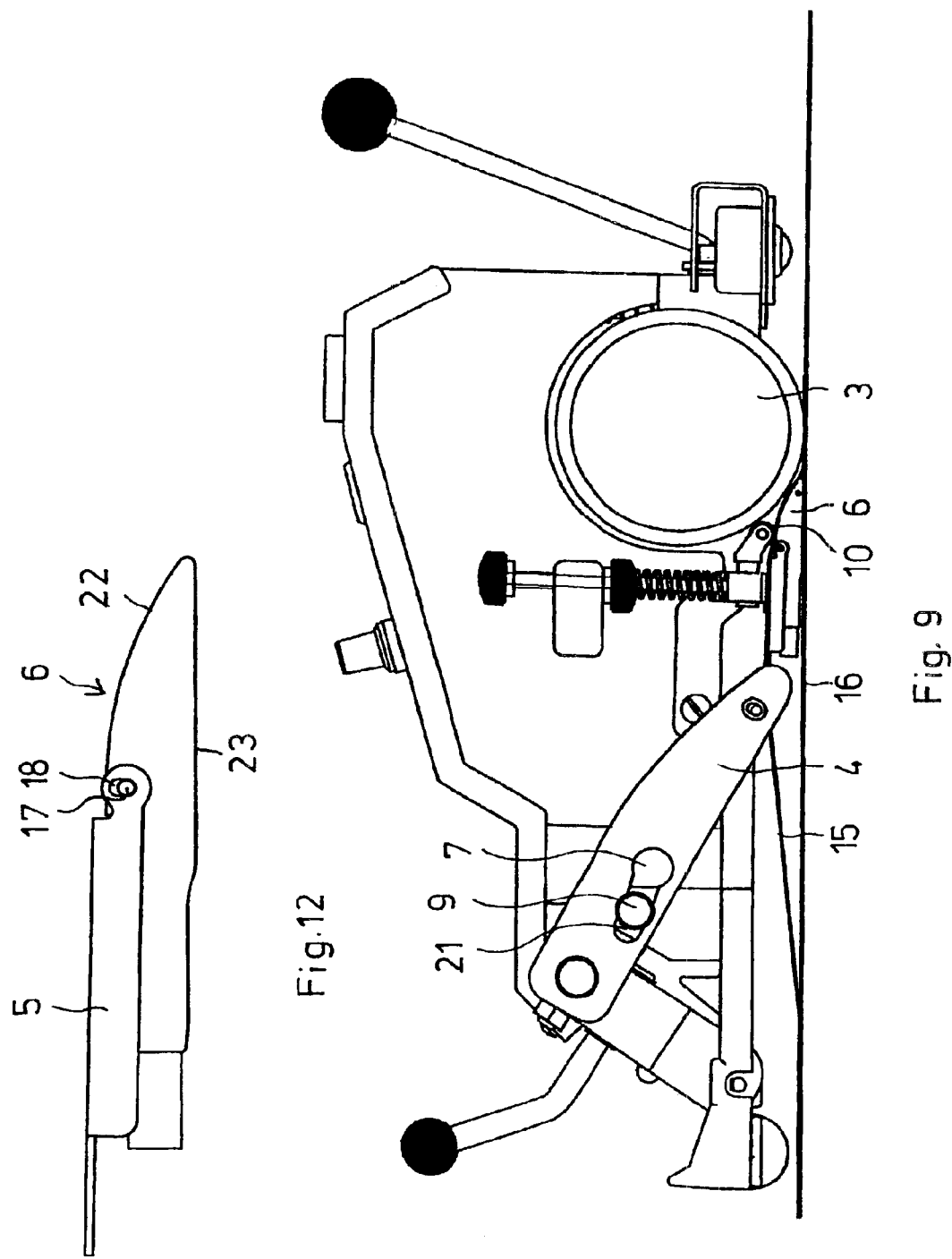
FIG. 9 illustrates a side view of the welding appliance with the holding arm and heating wedge in the welding position.
Figure 10:
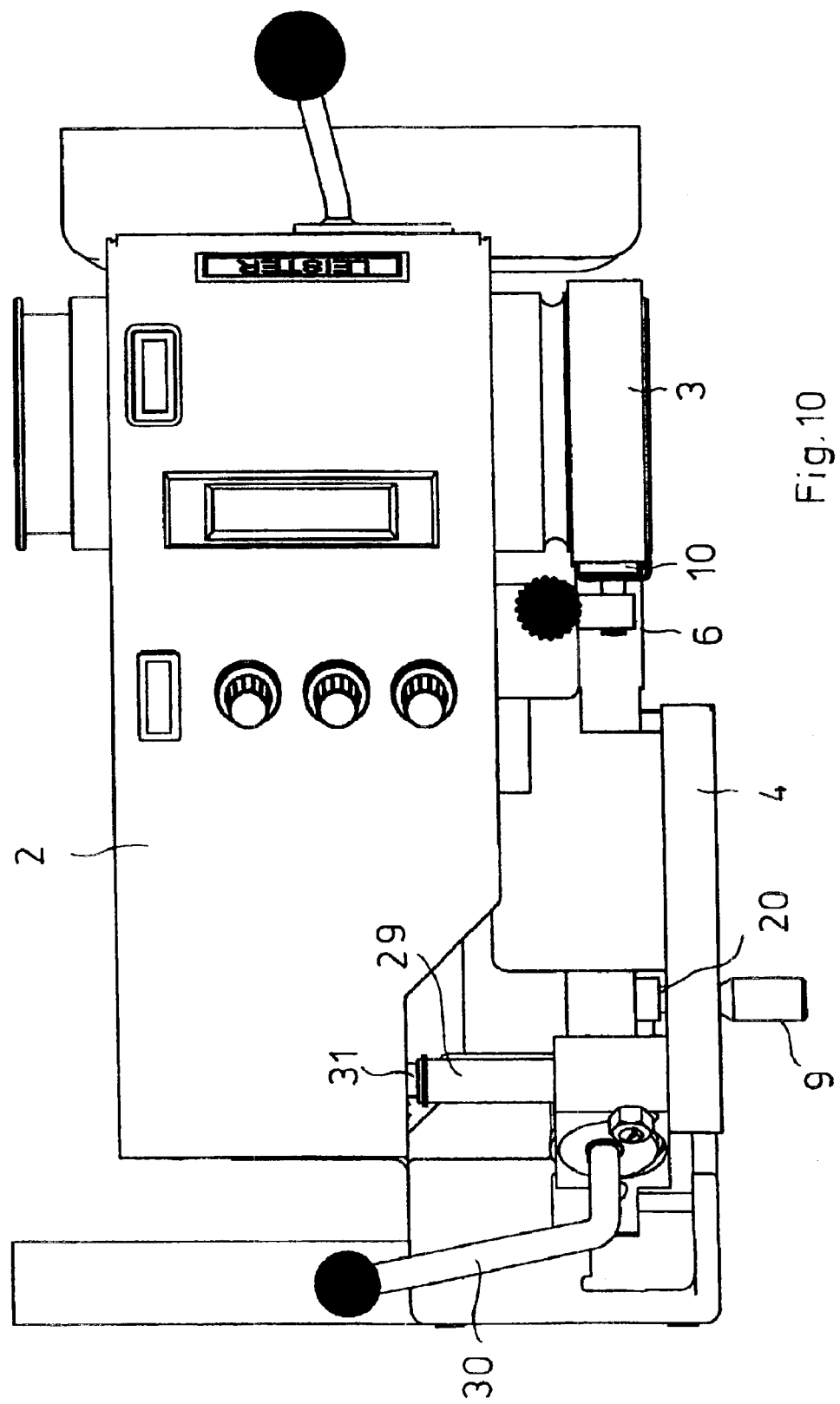
FIG. 10 illustrates a top view of the welding appliance with the holding arm and heating wedge in the welding position.

Finally, in FIGS. 8 to 10, the heating wedge 6 is located near to the pressure roller 3 with the smallest possible gap between the heating wedge 6 and the pressure roller 3. The holding-down roller 10 presses the upper material web 15 onto the top side of the heating wedge 6 and consequently the latter against the lower material web 16. The guide pin 9 is then located at the end of the region 21. When this end position is reached, the switch 31 is also actuated by means of the rack 29 and the drive is switched on for the advance of the housing 2 via a control/regulating device, not illustrated. The guide edges 8 bring about the desired path of the heating wedge 6 in this region. The control/regulating device regulates in a known and generally customary way the temperature of the heating wedge and the other parameters necessary for the welding operation.

The pins 17 in the lugs 18 of the holding plate 5 can move upward, in order, by virtue of unevennesses, to make available a clearance in which the heating wedge 6, contacting the lower material web 16, can be adapted. The latter may in this case also tilt laterally or in the longitudinal direction to a slight extent.

Figure 11:
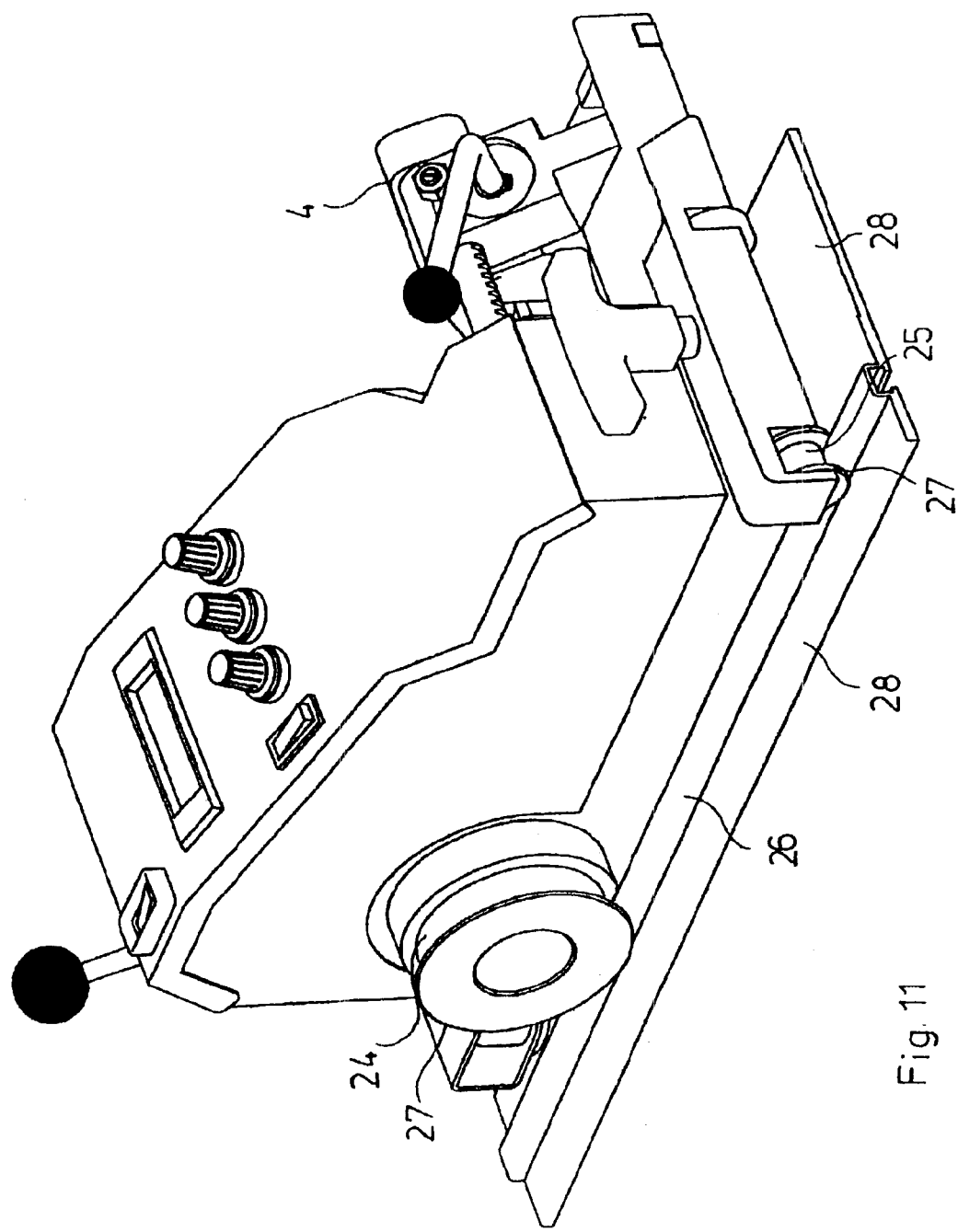
FIG. 11 illustrates a perspective view of the welding appliance from the side located opposite the heating wedge, with the guide device and with the rail lying on the films.

FIG. 11 shows the guide rollers 24 and 25 which are arranged on the other side of the housing and which travel along on a guide rail 26 lying on the upper material web 15 (not illustrated here). In the exemplary embodiment, the guide rollers 24 and 25 are not driven. They have a rim 27 which prevents slipping off from the guide rail 26. In the exemplary embodiment, the guide rollers 24 and 25 run on a parallelepipedic guide rail 26 with bearing surfaces laterally adjoining it. It is possible in exactly the same way to provide a guide rail with a more or less low-lying groove, in which guide rollers run.

What is claimed is:

1. A method for welding overlapping pieces of plastic material comprising:

providing a first piece of plastic material on a firm base;

positioning a second piece of plastic material relative to the first piece of plastic material to provide an overlapping region;

introducing a heating wedge between the first piece and second piece of plastic material on the overlapping region;

moving the heating wedge while hot in a vertical direction along the first piece of plastic material to maintain contact with the first piece of plastic material in the overlapping region for heating same; and pressing by means of a pressure roller the second piece of plastic material onto the heated first piece of plastic material while on the firm base for welding at least a portion of the overlapping pieces of plastic material together.

2. The method as claimed in claim 1, including pressing the heating wedge onto the first piece of plastic material by means of a resiliently mounted hold down roller which presses the second piece of plastic material against a top side of the heating wedge.

3. The method as claimed in claim 1, including moving the heating wedge from a standby position into a welding position wherein the heating wedge is moved between the first and second pieces of material to a position near a pressure roller for pressing the second piece of plastic material onto the first piece of plastic material.

4. The method according to claim 3, including moving the heating wedge from the standby position to a first intermediate position near to and above the first piece of plastic material wherein the second piece of plastic material is lifted by the heating wedge and, thereafter, moving the heating wedge to a second intermediate position where the heating wedge is positioned on the first piece of plastic material without pressure and, thereafter, bringing the heating wedge into welding position on the first piece of plastic material proximate to the pressure roller.

5. The method as claimed in claim 4, including moving the heating wedge while hot along the first piece of plastic material once the welding position is reached.

6. The method as claimed in claim 1, including fixing the first piece of plastic material and the second piece of plastic material to prevent distortion during the welding of same.

7. The method as claimed in claim 6, including laying an extendable rail on the second piece of plastic material during the welding operation for preventing distortion.

8. A welding device for welding overlapping pieces of plastic material comprises:

heating wedge means for heating at least one piece of plastic material;

pressure roller means for pressing the overlapping piece of plastic material together;

means for moving the heating wedge from a first position remote from the pressure roller to a second position proximate to the pressure roller wherein the heating wedge heats the at least one piece of plastic material wherein the means for moving includes means for moving the heating wedge in a vertical direction; and means for resiliently pressing the heating wedge onto the at least one piece of plastic material.

9. A welding device as claimed in claim 8, wherein the means for moving further includes a holding arm on which the heating wedge is arranged.

10. The welding device as claimed in claim 8, wherein a holding arm is arranged in a guide slot and a guide pin engages the guide slot.

11. The welding device as claimed in claim 8, wherein means is arranged on a holding arm for moving the welding wedge during welding.

12. The welding device as claimed in claim 8, wherein the means for resiliently pressing comprises a pressure device for pressing a second piece of plastic material onto the heating wedge while at the same time pressing the heating wedge against the at least one piece of plastic material.

13. The welding device as claimed in claim 8, wherein the heating wedge has an arcuate upper surface and a planar lower surface in contact with the at least one piece of plastic material during welding.

14. The welding device as claimed in claim 13, wherein the lower contact surface is longer than the arcuate upper surface.

15. The welding device as claimed in claim 8, further including a guide device which presses onto a guide rail which bears on the overlapping pieces of plastic material during welding.

16. A method for welding overlapping pieces of plastic material comprising:

providing a first piece of plastic material on a firm base;

positioning a second piece of plastic material relative to the first piece of plastic material to provide an overlapping region;

fixing the first piece of plastic material and the second piece of plastic material to prevent distortion during the welding of same including laying an extendable rail on the second piece of plastic material during the welding operation for preventing distortion;

introducing a heating wedge between the first piece and second piece of plastic material on the overlapping region;

moving the heating wedge while hot along the first piece of plastic material in the overlapping region for heating same; and pressing the second piece of plastic material onto the heated first piece of plastic material for welding same.

17. The method as claimed in one of claims 7 and 16, including pressing the extendable rail down during welding.

18. A welding device for welding overlapping pieces of plastic material comprises:

heating wedge means for heating at least one piece of plastic material;

pressure roller means for pressing the overlapping piece of plastic material together;

means for moving the heating wedge from a first position remote from the pressure roller to a second position proximate to the pressure roller wherein the heating wedge heats the at least one piece of plastic material;

means for resiliently pressing the heating wedge onto the at least one piece of plastic material; and a guide device which presses onto a guide rail which bears on the overlapping pieces of plastic material during welding.

* * * * *